Apr. 3, 1923.

H. T. MAITLAND

APPARATUS FOR TREATING OILS

Original Filed June 21, 1918     2 sheets-sheet 1

1,450,326

Inventor:
Harold T. Maitland
by his Attorneys,
Howson & Howson

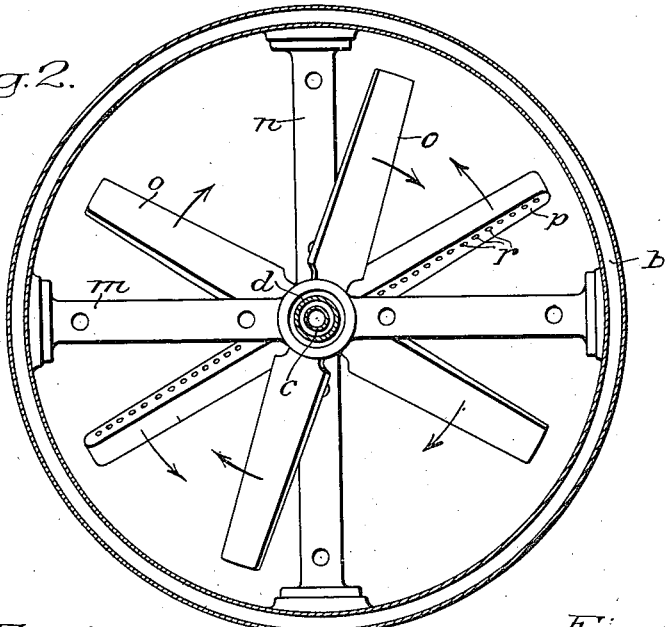
Fig. 2.
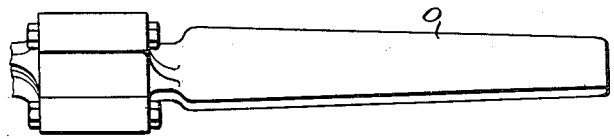
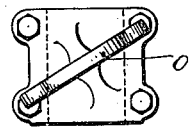
Fig. 3.   Fig. 4.
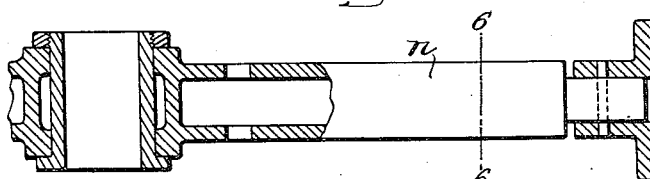
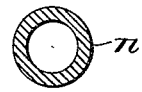
Fig. 5.   Fig. 6.
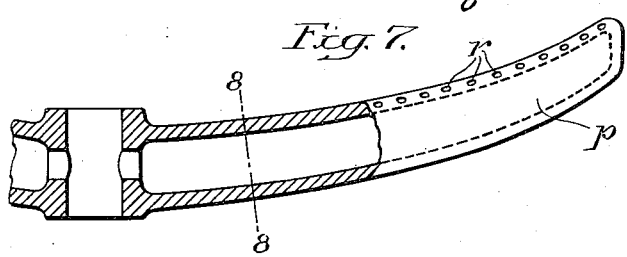
Fig. 7.   Fig. 8.
Inventor:
Harold T. Maitland,
by his Attorneys,
Howson & Howson Patented Apr. 3, 1923.

1,450,326

UNITED STATES PATENT OFFICE.

HAROLD T. MAITLAND, OF SHARON HILL, PENNSYLVANIA, ASSIGNOR TO SUN OIL COMPANY, OF PHILADELPHIA, PENNSYLVANIA, A CORPORATION OF NEW JERSEY.

APPARATUS FOR TREATING OILS.

Application filed June 21, 1918, Serial No. 241,210. Renewed August 29, 1922. Serial No. 585,060.

*To all whom it may concern:*

Be it known that I, HAROLD T. MAITLAND, a citizen of the United States, residing in Sharon Hill, Delaware County, Pennsylvania, have invented the Apparatus for Treating Oils, of which the following is a specification.

The object of my invention is to provide an apparatus for digesting and mechanically masticating mineral oils. I have found it especially serviceable in the treatment of the "sludge" formed as a precipitate in the usual acid treatment of lubricating oil stock, whereby the excess mineral acid is removed from the sludge, thereby producing a saponifiable oil in accordance with the description contained in an application filed by me dated April 15, 1919, Serial No. 290,228, and Serial No. 439,948 filed January 26, 1921. The apparatus, however, is not limited to this particular use and may be found available for use in other processes. In the description of the operation, however, I shall set forth the manner in which it is operated in treating the sludge above named.

A preferred embodiment of the invention is shown in the accompanying drawings, in which—

Fig. 2 is a plan view of the interior of the digester;

Fig. 3 is a side view and Fig. 4 an end view of one of the rotary stirrers.

Fig. 5 is a side view, and Fig. 6 a cross-section of one of the cross-bars.

Fig. 7 is a side view and Fig. 8 a cross-section of an other of the rotary stirrers.

Figure 1:
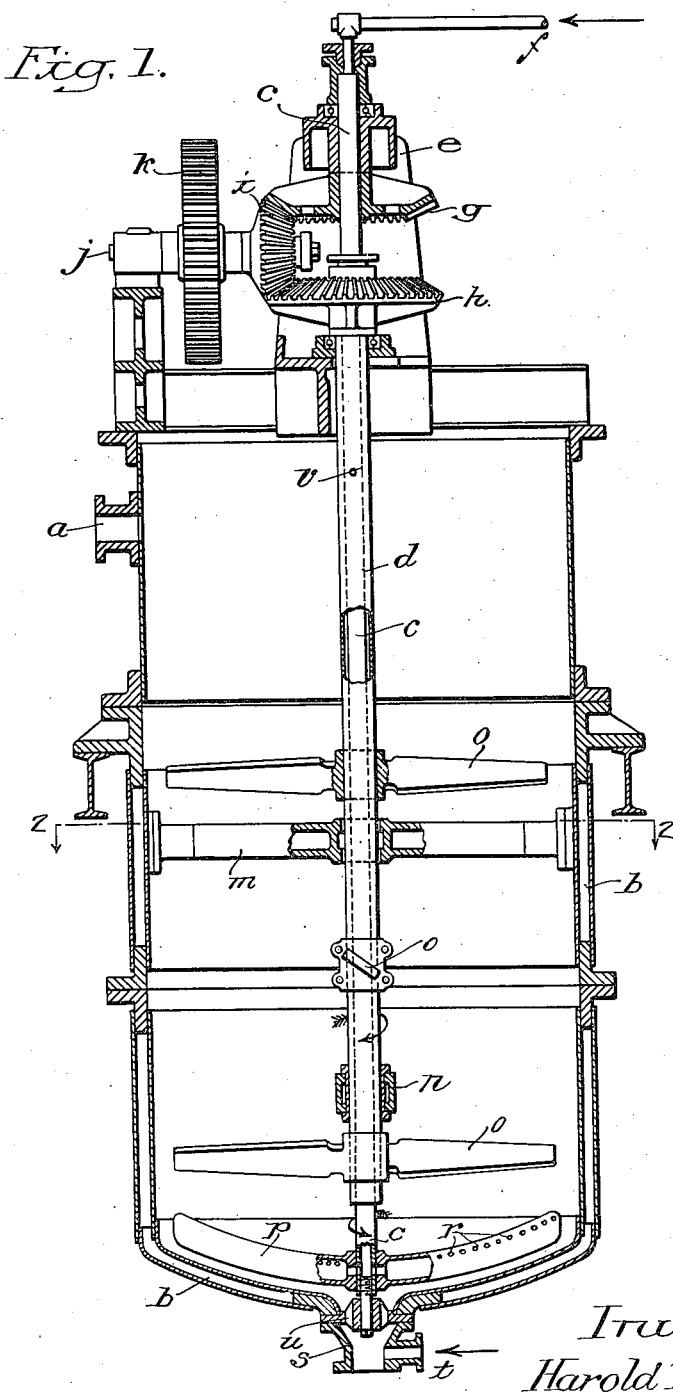
Fig. 1 is a vertical sectional view of the digester.

The digester comprises a stationary upright cylindrical vessel provided in its bottom and along its upright wall up to below the discharge $a$ with steam jackets $b$, which are adapted to withstand a pressure of one hundred pounds to the square inch. Extending centrally of the vessel is a rotatable hollow shaft $c$ turning in bearings in the bottom of the digester and in a frame $e$ mounted on the top of the digester. Concentrically surrounding and spaced from the shaft $c$ is a second hollow shaft $d$, which turns in bearings in the upper frame $e$ and in the lower interfering bar $n$ hereinafter described. The inner shaft $c$ communicates at its upper end with a pipe $f$ for admission of steam or water. Shafts $c$ and $d$ have secured respectively thereto bevel gears $g$ and $h$, which are driven in opposite directions by a bevel gear $i$ on the driving shaft $j$ which turns in bearings on the top of the digester and carries a driving gear $k$.

The inner wall of the digester should be covered with some acid-resisting metal or composition if it should be used for the purpose above described.

Across the lower part of the digester extend two interfering bars $m$ and $n$. Preferably these interfering bars extend at right angles to each other. Secured to the outer shaft $d$ are special masticating and stirring paddles $o, o, o$, which have a sweep or pitch adapted to produce a lifting effect upon the material being treated. Besides lifting and agitating the sludge they cooperate with the interfering bars to effect a thorough mastication thereof. The more nearly adjacent paddles are arranged angularly to each other.

Another paddle $p$, secured to the lower end of the inner shaft $c$, and extending close to the bottom of the digester, performs functions similar to those performed by the paddles $o$, but its turns, of course, in the opposite direction. It also performs the function of admitting into the digester the steam or water, or a mixture of steam and water, which descends through the inner shaft $c$. For this purpose the paddle $p$ is made hollow and is provided, along that edge thereof which, in rotation, is the rear edge, with a number of perforations $r$, through which the steam or water, or a mixture of steam and water, is discharged into the interior of the digester.

Steam or water, or a mixture of steam and water, may also be discharged into the digester from beneath, and for this purpose a hollow casting $s$ is secured to the bottom of the digester having an inlet pipe $t$; holes $u$ in the bottom of the digester affording communication between the casting $s$ and the interior of the digester.

The annular space between the two shafts is flushed with steam or water, or a mixture of steam and water, entering said space through the orifice $v$ in the wall of the inner pipe, so that corrosive chemicals do not come into contact with unprotected surfaces.

In the treatment of the sludge, the digester is filled with water up to or somewhat below the outlet $a$, the water having a temperature of approximately 150-200 degrees F. The desired temperature is maintained throughout the operation by means of the steam jackets and by live steam blown into the contents through the pipes *f* and *t*. After the introduction of the sludge, the same is thoroughly mixed with the water and mechanically masticated. Water and steam, or both, may be added continuously or intermittently, the surplus liquid, which comprises the lighter constituents of the mixture, overflowing at the outlet *a*. These lighter constituents consist of mineral acids and certain other compounds.

The driving mechanism should be so governed as to permit of varying the speed of rotation of the shafts and paddles in accordance with the condition, at any given time, of the material being treated. So, also, the temperature of the contents may be varied to suit conditions. The sludge is tested for acidity at intervals. When the content of mineral acid has been reduced to the extent desired, the admission of water and steam is cut off, the rotation of the shafts and stirrers stopped, and the excess washing liquid is siphoned or drawn off.

It is of importance, at least in the foregoing treatment of sludge, that no air be permitted to mix with the sludge, as the buoyancy of the air causes the small particles of sludge to rise to the surface and to be carried away with the washing liquid. The residual compounds settling to the bottom of the digester are saponifiable oils containing some dissolved or suspended mineral oils.

I claim:

1. A digester and mechanical masticator comprising a vessel, a rotatable upright hollow shaft, a hollow stirrer secured to and communicating interiorly with the shaft, means to introduce fluid into the upper part of the shaft, the same therefore passing through the shaft into the stirrer and thence into the interior of the vessel, and means to introduce washing liquid into the vessel through the bottom thereof.

2. A digester and mechanical masticator comprising a vessel, hollow shafts within the vessel, one inside the other, stirrers secured to the shafts, means to rotate the shafts in opposite directions, means to introduce a washing fluid into one of the shafts and thence into the vessel, there being an opening in the wall of the inner shaft to effect flushing of the annular space within the two shafts.

3. A digester and mechanical masticator comprising a vessel, hollow shafts within the vessel, one inside the other and rotatable on a common axis, a hollow stirrer at the lower part of the vessel and secured to the inner shaft and communicating interiorly therewith, the stirrer having perforations opening into the interior of the vessel, stirrers secured to the outer shaft, and means to turn the shafts in opposite directions.

4. A digester and mechanical masticator comprising a vessel, hollow shafts within the vessel, one inside the other and rotatable on a common axis, a hollow stirrer at the lower part of the vessel and secured to the inner shaft and communicating interiorly therewith, the stirrer having perforations opening into the interior of the vessel, stirrers secured to the outer shaft, cross bars connecting the sides of the vessels and cooperating with the stirrers to effect more thorough mechanical mastication of the material being treated, and means to turn the shafts in opposite directions.

5. A digester and mechanical masticator comprising a vessel, hollow shafts within the vessel, the outer shaft being spaced from the inner shaft to provide an annular fluid channel between the shafts, means to turn the shafts in opposite directions, and stirrers turnable with the respective shafts.

6. A digester and mechanical masticator comprising two shafts one inside the other, means to turn the shafts in opposite directions, stirrers on both shafts, and stationary interfering bars extending radially between the shafts and the inner wall of the vessel.

7. A digester and mechanical masticator comprising two shafts one inside the other, means to turn the shafts in opposite directions, stirrers on the outer shaft, stationary interfering bars extending radially between the shafts and inner wall of the vessel and opposing resistance to the circulation of liquid created by said stirrers, and a stirrer on the lower end of the inner shaft, the last named stirrer and inner shaft being hollow.

8. A digester and mechanical masticator comprising a vessel, a hollow upright shaft within the vessel, a hollow stirrer secured to and communicating with the interior of the hollow shaft, and means to introduce fluid into the shaft, the stirrer being provided along that part thereof which in rotation is the rear with discharge perforations.

9. A digester and mechanical masticator comprising a vessel, a hollow upright shaft within the vessel, a hollow stirrer secured to and communicating with the interior of the hollow shaft, means to rotate the shaft, said hollow stirrer being of general oval form in cross section, the greatest dimension lying in a plane at an angle to the axis of the shaft and inclined in a direction to raise the material by the rotation of the said hollow stirrer, and means to introduce fluid into the hollow stirrer, said stirrer being provided with openings in the upper wall to further raise the material raised by the stirrer.

10. A digester and mechanical masticator comprising a vessel, a hollow upright shaft within the vessel, a hollow stirrer secured to and communicating with the interior of the hollow shaft, a second shaft surrounding the first shaft, stirrers on said second shaft above the hollow stirrers, means to rotate said shafts in reverse directions, the stirrers on the second shaft being arranged to lift the material, said hollow stirrer being of general oval form in cross section, the greatest dimension lying in a plane at an angle to the axis of the shaft and inclined in a direction to raise the material by the rotation of the said hollow stirrer, and means to introduce fluid into the hollow stirrer, said stirrer being provided with openings in the upper wall to further raise the material raised by the stirrer.

In witness whereof I affix my signature.

HAROLD T. MAITLAND.